UNITED STATES PATENT OFFICE.

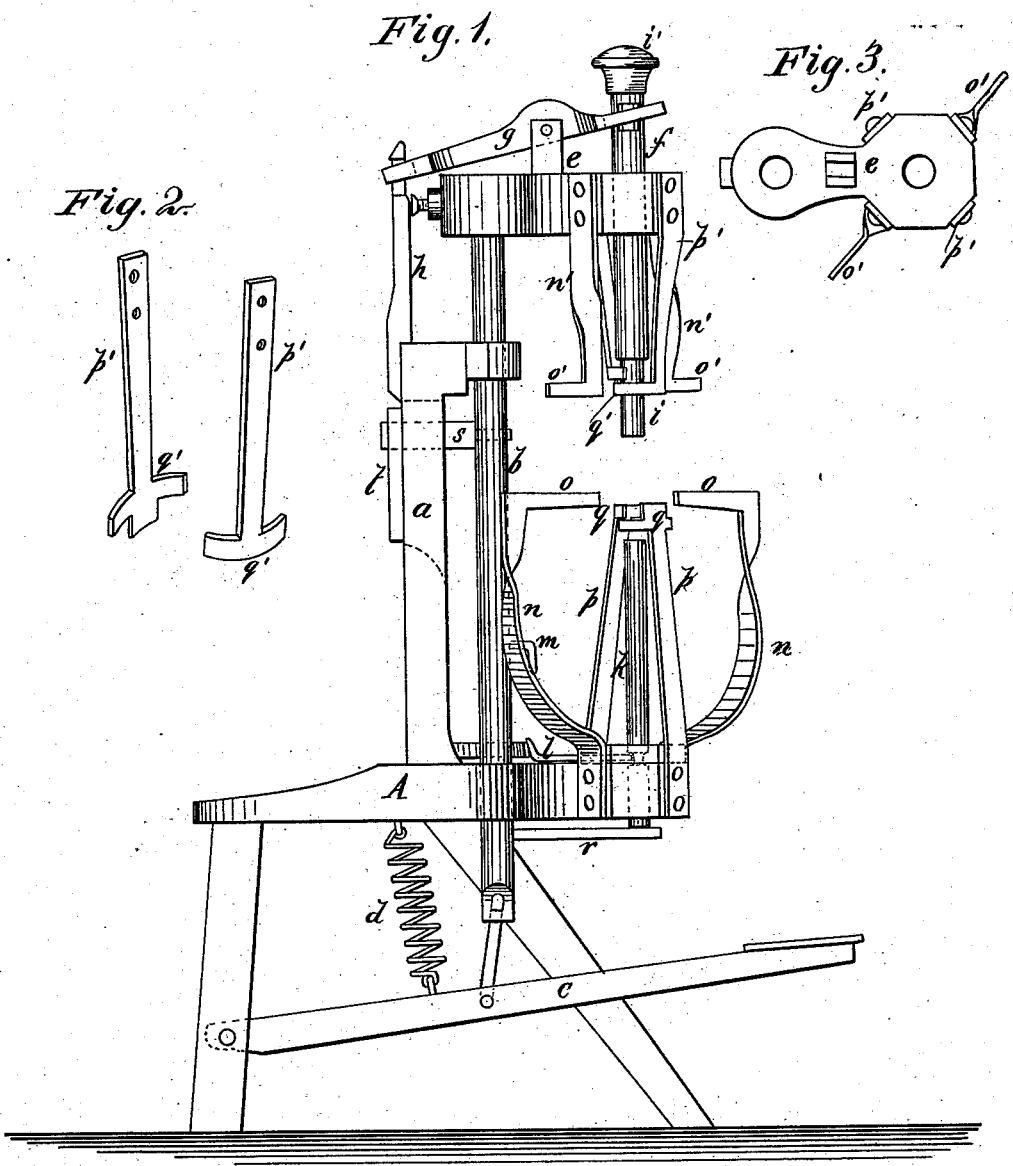

JOHN K. HOGAN, OF PLACERVILLE, CALIFORNIA.

PEACH-STONER.

SPECIFICATION forming part of Letters Patent No. 225,378, dated March 9, 1880.

Application filed December 1, 1879.

*To all whom it may concern:*

Be it known that I, JOHN K. HOGAN, of Placerville, in the county of El Dorado and State of California, have invented a new and useful Improvement in Machines for Removing Stones from Peaches, &c., of which the following is a specification.

This machine is intended for splitting peaches and other fruits in halves and removing the stones in preparing the fruit for preserving, and is especially adapted for the varieties of peaches known as "cling-stones," which are generally preserved whole on account of the difficulty experienced in freeing the stones by hand.

I make use of spring-fingers and fixed knives, with a double-acting plunger carrying knives and spring clearing-fingers, whereby the peach is first split, and by a further movement of the plunger the spring-fingers free the stones from the fruit, whereby the work is done in a clean and rapid manner without injuring the fruit.

The construction and operation will be more particularly described with reference to the accompanying drawings.

Figure 1 is a side elevation of the machine. Fig. 2 shows the spring-fingers separately. Fig. 3 is a plan of the reciprocating head.

Similar letters of reference indicate corresponding parts.

A is the bed of the machine, supported on legs at a convenient height. $a$ is a standard sustained rigidly on bed A. B is a slide-rod, fitted for vertical movement in a box at the upper end of standard $a$, and extending through bed A, its lower end connected by a link with a treadle, $c$, that is pivoted beneath the bed. $d$ is a spring for raising the treadle. $e$ is a head, attached to the upper end of rod $b$ by a set-screw, and extending horizontally to the front. $f$ is a tubular plunger, fitted in a vertical aperture in the outer end of head $e$ to slide freely. $g$ is a lever fulcrumed on head $e$, with one forked end passing between lugs or projections on tube $f$, and the opposite and longer arm forked and setting upon a T-headed vertical post, $h$, that rises from standard $a$. $i$ is a solid plunger within tube $f$, longer than the tube, and fitted at its upper end with a knob or head, $i'$.

In the bed A, in a line vertical with plunger $i$, is a rod or anvil, $k$, fitted to slide freely, and sustained in its raised position by a spring-trigger, $l$, that enters an annular groove in $k$, and is bent upward at its outer end in the path of an inclined projection, $m$, from rod $b$. From the bed A, at opposite sides of the anvil $k$, rise the rigid arms $n$, which are bent inward above the anvil to form cutters $o$. From bed A, between the arms $n$, rise the spring-arms $p$, which are formed at their upper end with cutting-fingers $q$ of semicircular form.

The head $e$ carries arms $n'$, having cutters $o'$, and spring-arms $p'$, having fingers $q'$, these parts being duplicates of the devices just described as attached to bed A, and the cutters $o''$ being in the plane of cutters $o$.

In operation, the peach to be split will be held by hand on the cutters $o$, and the head $e$, with its attached parts, brought down by pressing upon the treadle. The first movement causes the peach to split by the pressure of the cutters $o'$, and the fingers $q$ $q'$ enter and take upon opposite ends of the stone. At this moment the longer arm of lever $g$ comes in contact with a lug on post $h$, and the further movement causes the short arm of the lever $g$ to force down the tubular plunger $f$ with a quick movement, and spreads the fingers $q$, so that they slide over the stone and separate the same. The plunger $i$ is at the same time raised by contact with the stone, and the fingers $q$ move over the lower portion of the stone while it rests on anvil $k$. These cutters and fingers meet at the center when the downward movement of the head is completed. At that moment the trigger $l$ is drawn back by projection $m$, the anvil $k$ drops, and the stone may be forced out by a slight blow on the upper end of plunger. The spring $d$ returns the head $e$ and its attached parts to the first position. An arm, $r$, projecting from the slide-rod $b$, raises the anvil $k$ to its position, where the trigger $l$ catches it.

The rod $b$ is guided by a pin, $s$, which projects from it through a slot in standard $a$ between the adjustable guide-plates $t$, that are attached to the standard by set-screws.

The splitting-knives and clearing-fingers may be varied in form from those shown, and the clearers may be arranged to follow the surface of the stone by contact without being spread by the plunger.

This machine is adapted for use with other fruits than peaches, such as nectarines, plums, &c.

Having thus described my invention, I claim as new and desire to secure by Letters Patent—

1. In a machine for removing stones from peaches, the fingers $q\ q'$, arranged on the spring-arms $p\ p'$, in combination with the plungers $f\ i$ and anvil $k$, as and for the purpose specified.

2. In machines for separating stones from peaches, the combination, with the reciprocating head $e$, carrying the cutters $o'$ and clearing-fingers $q'$, of the tubular plunger $f$, solid plunger $i$, lever $g$, and fixed post $h$, substantially as and for the purposes specified.

3. In machines for separating stones from peaches, the anvil $k$, supported in the bed of the machine by the spring-trigger $l$, in combination with the reciprocating rod $b$, fitted with the projection $m$ and arm $r$, substantially as described and shown, and for the purposes set forth.

JOHN KEELER HOGAN.

Witnesses:
   JAS. E. DEAN,
   WM. WILTSE.